United States Patent [19]

White et al.

[11] 3,999,961
[45] Dec. 28, 1976

[54] SULFUR CONTROL OVER CARBON FORMATION IN HIGH TEMPERATURE REFORMING OPERATIONS

[75] Inventors: Gerald A. White, Los Angeles; Theodore R. Roszkowski, Malibu, both of Calif.; Harold W. Fleming, Jefferson Town, Ky.

[73] Assignee: Ralph M. Parsons Company, Pasadena, Calif.

[22] Filed: Oct. 28, 1975

[21] Appl. No.: 625,878

Related U.S. Application Data

[63] Continuation-in-part of Ser. No. 525,483, Nov. 20, 1974, abandoned.

[52] U.S. Cl. ............................................ 48/214 A
[51] Int. Cl.$^2$ ......................................... C01B 2/14

[58] Field of Search ......... 48/215, 213, 214, 197 R

[56] References Cited
UNITED STATES PATENTS 3,103,423  9/1963  Pearce ............................ 48/197 R

*Primary Examiner*—R.E. Serwin
*Attorney, Agent, or Firm*—Christie, Parker & Hale

[57] ABSTRACT

Hydrogen sulfide replaces a portion of the water required to suppress the formation of carbon in gas phase catalytic reforming and hydrocracking processes of hydrocarbons, particularly aromatics. Hydrogen is present to prevent carbon formation from the hydrocarbons.

14 Claims, No Drawings

SULFUR CONTROL OVER CARBON FORMATION IN HIGH TEMPERATURE REFORMING OPERATIONS

CROSS-REFERENCE TO RELATED APPLICATIONS

This is a continuation-in-part of our application Ser. No. 525,483 filed Nov. 20, 1974 now abandoned.

BACKGROUND OF THE INVENTION

The present invention is directed to the prevention of carbon formation in gas phase reforming catalytic operations at temperatures above 900°F. Reforming is the conversion of high molecular weight hydrocarbons, such as naphtha and crude oil by reaction with steam to lower molecular weight species, such as methane or the conversion of any hydrocarbon to carbon oxides and hydrogen. A particular example is the reforming of methane to hydrogen and the oxides of carbon. Hydrocracking is a form of reforming which includes the conversion of heavier hydrocarbons to lower molecular species by reaction with hydrogen.

The catalytic reforming of natural gas, refinery gases, liquefied petroleum gases and naphthas is practiced commercially for the production of syngases or "rich" gases which are used for the production of hydrogen, ammonia, methanol and other chemicals. Conventionally, the reforming reaction occurs on a nickel-type catalyst in the presence of steam at temperatures ranging from the reformer inlet of 900°F to the outlet of approximately 1600°F. Excess steam over the stoichiometric quantity required for the reforming reaction, is used not only to achieve a high degree of conversion to syngas, but also to assist in the prevention of carbon formation from the syngas produced or from a syngas containing hydrogen and carbon oxides which may be added as reactants in the reforming process.

Sulfur is regarded as a catalyst poison in the reforming operation. It is believed necessary to reduce the total quantity of sulfur present to levels substantially below 1 ppm if not eliminate them. Higher concentrations of sulfur have been noted to cause a reduction in the activity of the catalyst which leads to carbon formation from the hydrocarbon feed materials. Once formed, carbon catalyzes its own formation. For example, in the conversion of naphtha to a syngas consisting mainly of hydrogen and carbon oxides to methane, catalytic reforming is limited to a 400°F end point feed stock which can contain no more than about 0.2 ppm sulfur using a minimum of about 1.4 pounds of steam per pound of feed stock. Of this total steam, excess over the stoichiometric quantity required for reforming, and which is used to control carbon formation, results in a loss of thermal efficiency for the process and added costs for its recovery and separation as a condensate from the product gas.

SUMMARY OF THE INVENTION

It has now been found that in a process wherein a hydrocarbon in the presence of water is reformed in the presence of a reforming catalyst at a temperature from about 900° to about 1600°F, the water present in excess of the stoichiometric amount required for reforming and for the purpose of suppressing the formation of carbon is at least in part supplanted by relatively minor amounts of hydrogen sulfide provided there is also present in the reaction mixture a source of hydrogen in the form of free hydrogen and/or carbon monoxide in a quantity sufficient to satisfy the stoichiometry required for converting all of the carbon in the feed to methane.

While functional for reforming all hydrocarbons, the process is particularly utile for reforming of aromatic hydrocarbons.

The amount of hydrogen sulfide used to prevent carbon formation is at least 1 part per million and preferably from about 2 to about 5000 parts per million, more preferably from about 10 to about 1000 parts per million, depending on the nature of reaction conditions and the amount of water to be replaced.

The function of the hydrogen sulfide is to prevent the formation of carbon due to the interaction of the oxides of carbon with themselves or with hydrogen. In addition, the reforming catalyst may be modified by an alkali metal to prevent the formation of carbon from heavy hydrocarbons as well as from other mixed species, such as phenols, tars, pitch and the like.

The hydrogen sulfide used to preclude carbon formation during reforming can be present in the feed or added from any convenient sulfur source. As reforming occurs under highly reducing conditions, any sulfur species such as sulfur dioxide, carbonyl sulfide, carbon disulfide, thiophenes, mercaptans and the like will be reduced to hydrogen sulfide to suppress carbon formation.

Because reforming involves reaction of hydrocarbons having a molecular weight greater than methane, there coexists the problem of carbon formation from the hydrocarbons. This is controlled by the presence of hydrogen as free hydrogen and/or carbon monoxide during the reforming reactions. Hydrogen may be provided, in the instance where the hydrocarbons have an end point up to about 350°F, by reaction of hydrocarbons with water in the absence of sulfur to yield hydrogen and carbon monoxide. Hydrogen may also be provided by combining a syngas containing hydrogen with the feed or by addition of free hydrogen. The amount of hydrogen provided either as free hydrogen and/or carbon monoxide must be sufficient to satisfy the stoichiometry of converting all the carbon in the feed to methane. At least about a 10% excess of hydrogen or its equivalent is preferred.

Through the use of hydrogen sulfide in combination with hydrogen to suppress carbon formation, there is avoided the cost of generating steam for the purpose of controlling carbon formation and the cost of recovering the steam from the product gas stream. The presence of hydrogen is also essential to the reforming of aromatic hydrocarbons.

DETAILED DESCRIPTION

According to the present invention, hydrogen sulfide in combination with a source of hydrogen as components of the gas stream undergoing a reforming reaction is used to supplant all or a major portion of the water used to control the formation of carbon from the oxides of carbon during reforming or contained in a syngas which may be added as a reactant for the reforming reaction or from the hydrocarbons themselves.

Processes to be benefited in accordance with the practice of this invention are those which involve reforming of a hydrocarbon in the presence of at least water and catalyst at temperatures from about 900° to about 1600°F, preferably from about 1000° to about 1500°F. Pressures generally range from about atmospheric to about 1200 psia or more.

As used herein, by the term "reforming", there is meant the conversion of high molecular weight hydrocarbons to lower molecular weight hydrocarbon species as well as the oxides of carbon. Methane is normally the predominant residual hydrocarbon species present in the product gas when a "rich gas" is produced by reforming. Included within the meaning of reforming are hydrocracking reactions.

The hydrocarbons which are subject to reforming can be varied widely. Examples are methane, naphtha, gas oil, crude oils, distillate fractions, residual fuel oil, shale oil, tar sands and the like.

Particularly benefited are processes where the hydrocarbons present include aromatics. By the term "aromatics" there is meant benzene and its homologs and condensed or fused nuclear compounds in which two or more carbon atoms are shared in common by two or more aromatic rings. The aromatics include substituted and unsubstituted compounds. Such compounds, as is known in the art, are most difficult to reform, but are readily reformable in the presence of both hydrogen and hydrogen sulfide. Illustrative of the aromatics reformed in accordance with the invention there may be mentioned, benzene, napthalene, anthracene, phenol, aniline and the like.

The reforming catalysts employed are those which typically contain a metal from the third period of Group VIII of the Periodic Table on a temperature stabilized ceramic support. Alumina is the preferred support. Nickel and cobalt are the preferred metals with nickel particularly preferred. The support for the catalyst is rendered thermally stable by heat treating the support as by calcining and the like at temperatures above which reforming is to occur prior to depositing the metal on the support. The preferred supports are of relatively low surface area and the alumina content is maximized to prevent other constituents, such as silica from being volatilized and contaminating heat exchanger surfaces.

Using catalyst of this nature, reforming normally occurs at an inlet temperature of about at least 900° F and allowed to proceed until the temperatures up to about 1700° F are reached.

The gas streams undergoing reforming comprise a mixture of the hydrocarbons, and water as stream, and occur in the presence of hydrogen sulfide and a source of hydrogen. Water in excess of that stoichiometrically required for reforming reactions is present for the purpose of controlling carbon formation from the interaction of the oxides of carbon with themselves or with hydrogen.

Carbon as is well known has always presented a problem in reforming operations, particularly where catalysts are employed since carbon deposition onto the catalyst will promote further carbon deposition leading to termination of catalyst activity.

It is impossible to predict the regions where carbon will form by a consideration of operating pressure, temperature and the principle contributors to the formation of carbon in the product gas from reforming, namely hydrogen, methane, carbon monoxide, carbon dioxide, steam and carbon itself. These constituents provide the three elements, carbon, hydrogen and oxygen necessary to enter into the complex chemical reactions which lead to carbon formation.

Since the number of chemical elements can be reduced to three, namely carbon, hydrogen and oxygen, the raw materials, their intermediate and final products and all mixtures thereof can be represented as unique points of composition on a ternary diagram of the three elements for at least the reactions occurring during reforming.

The establishment of these points, however, can only be determined by an iterative convergence method involving the solution of a set of simultaneous non-linear equations.

The series of equations to be solved are as follows:

$$(CH_4) + (CO) + (CO_2) + (C) = (C^*) \qquad (1)$$

$$2(H_2) + 4(CH_4) + 2(H_2O) = (H^*) \qquad (2)$$

$$(CO) + 2(CO_2) + (H_2O) = (O^*) \qquad (3)$$

$$K_1 = \frac{(H_2)^3 (CO)}{(CH_4)(H_2O)} \cdot \frac{(ATM)^2}{(TOT)^2} \qquad (4)$$

$$\log_{10} K_1 = A - K_1 + \frac{B - K_1}{°R} \qquad (5)$$

$$K_2 = \frac{(H_2)(CO_2)}{(CO)(H_2O)} \qquad (6)$$

$$\log_{10} K_2 = A - K_2 + \frac{B - K_2}{°R} \qquad (7)$$

$$K_3 = \frac{(CO_2)}{(CO)^2} \cdot \frac{(TOT)}{(ATM)} \qquad (8)$$

$$\log_{10} K_3 = A - K_3 + \frac{B - K_3}{°R} \qquad (9)$$

$$(TOT) = (H_2) + (CH_4) + (CO) + (CO_2) + (H_2O) \qquad (10)$$

$$(C) = 0 \qquad (11)$$

wherein:
- $(C^*)$ = total atoms carbon
- $(H^*)$ = total atoms hydrogen
- $(O^*)$ = total atoms oxygen
- $(H_2)$ = moles of hydrogen
- $(CH_4)$ = moles of methane
- $(CO)$ = moles of carbon monoxide
- $(CO_2)$ = moles of carbon dioxide
- $(H_2O)$ = moles of water
- $(TOT)$ = total moles of gas
- $(C)$ = atoms of solid carbon
- $K_1$ = reforming equilibrium constant for conversion of $CH_4$ to $H_2$ and $CO$
- $A-K_1$ = constant term of equation for reforming equilibrium constant for conversion of $CH_4$ to $H_2$ and $CO$
- $B-K_1$ = slope of equation for reforming equilibrium constant for conversion of $CH_4$ to $H_2$ and $CO$
- $K_2$ = water gas shift equilibrium constant for conversion of $CO$ to $H_2$
- $A-K_2$ = constant term of equation for water gas shift equilibrium constant for conversion of $CO$ to $H_2$
- $B-K_2$ = slope of equation for water gas shift equilibrium constant for conversion of $CO$ to $H_2$
- $K_3$ = equilibrium constant for carbon monoxide autoreduction to C
- $A-K_3$ = constant term of equation for equilibrium constant for carbon monoxide autoreduction to C
- $B-K_3$ = slope of equation for equilibrium constant for carbon monoxide autoreduction to C
- °R = degrees Rankine
- (ATM) = system pressure-atmosphere The mathematical system consists of twenty-one variables and eleven equations. Ten variables must be specified to make the system determinate. Six of the variables are the constants of the equations for equilibrium constants and fixed. Four more variables remain to be set. If the amounts of the three elements and the system pressure are set, then solution of the equations provides the temperature at which solid carbon will be deposited.

Alternatively, if the system temperature is specified, then a solution of the equations leads to the pressure at which solid carbon begins to deposit.

Finally, by specifying system pressure and temperature and two of the three elements, the equations yield the quantity of the third element at which carbon deposition is incipient. From the latter, the water required as steam can be determined.

The preceding equations include all significant species and reactions. The conditions to which they pertain are those of complete equilibrium, corresponding to the condition of a gas leaving a reaction zone. The gas stream entering a reaction zone is, however, removed from equilibrium. The only reactions during methanation which could possibly lead to the production of carbon are the decomposition of methane, the autoreduction of carbon monoxide and/or the reductions of carbon monoxide and/or carbon dioxide by hydrogen. The thermodynamic potentials for the formation of carbon from all these components during methanation are predictable from the mathematical derivation described above.

The system of mathematical equations presented is non-linear which prevents their solution by any of the standard methods for solving sets of simultaneous equations such as for linear systems. They are however, of a form which permits an iterative technique to be used for their solution and makes use of a digital computer desirable.

However, the ready availability of digital computers in the chemical industry today makes their solution easy.

One can from the above analysis for a given gas composition, operating pressure and reaction temperature determine the amount of water required to suppress the formation of carbon. The excess water present in the gas stream to control the formation of carbon is provided as steam and represents an additional cost to the methanation operation. There is also the cost of condensing and recovering the excess water from the product gas stream.

In accordance with the practice of this invention, water above that stoichiometrically required for the reforming reactions and present to suppress carbon formation is replaced in whole or in part by hydrogen sulfide.

The amount of hydrogen sulfide found to be effective to retard the formation of carbon is as little as one part per million, and can be as high as 10,000 ppm or more. A preferred range is from about 2 to about 5000 parts per million, more preferably from about 10 to about 1000 parts per million. Although there is no limit as to the amount of hydrogen sulfide which can be present, it has been found that amounts in excess of 50 parts per million will retard the rates of reaction over the catalyst. Any reduction in reaction rates or productivity is, however, compensated for by the amount of water conserved, as the water required to suppress carbon formation can be effectively eliminated.

The manner in which sulfur is introduced into the gas stream is not critical, as reforming occurs under reducing atmosphere conditions and any sulfur bearing compounds will be rapidly converted to hydrogen sulfide. It can, therefore, be introduced in the form of hydrogen sulfide itself as carbonyl sulfide, carbon disulfide, mercaptans, sulfur dioxide, thiophenes and the like.

Important to the practice of this invention is that hydrogen sulfide is to replace the water present for control of carbon, and not provided in addition to the water. If the water normally required for carbon control is present, and hydrogen sulfide is also present within the range set forth above there will be a diminution of productivity. As the amount of water is reduced and replaced by hydrogen sulfide, production will remain at high levels.

In replacing the excess water required to suppress carbon formation, a material reduction in the cost of reforming hydrocarbons can be realized. The product formed, however, is normally required to be substantially sulfur free. Following reforming, therefore, the hydrogen sulfide can be removed by conventional means such as the use of zinc oxide as a chemical extractant.

Aside from the tendency of the oxides of carbon to interact with themselves or with hydrogen to form carbon, there exists the separate problem of carbon formation from the hydrocarbons undergoing reforming. To cope with this hydrogen must be present during reforming to sustain conversion. The source of hydrogen used may be free hydrogen or carbon monoxide. In the instance where the hydrocarbons are light, i.e. containing constituents having an end point up to about 350°F, the hydrogen may be provided by the hydrocarbons which react, in part, with water in the presence of the catalyst and in the absence of sulfur to form hydrogen and the oxides of carbon. As this is rapid, the lighter hydrocarbons will generate sufficient hydrogen to prevent carbon formation external of the reforming reactor where reforming occurs in the presence of sulfur.

Although hydrogen purchased or produced from any source, as above, may be utilized, a most convenient source of hydrogen is a syngas which comprises hydrogen and the oxides of carbon. A syngas, if available, is especially preferred since the constituents will undergo methane forming reactions in the presence of the catalyst employed.

There is no upper limit to the amount of hydrogen which may be present during reforming since excess hydrogen will be part of the fuel value of the product gas. In general the minimum amount to be provided is that stoichiometrically required to satisfy the hydrogen deficiency of empirical formula of the hydrocarbon feed to convert all the carbon present to methane. For example, if the assay of the feed reveals it to have an empirical formula of $C_6H_6$ the minimum mole ratio of hydrogen to hydrocarbon would be 9:1. To assure trouble free operation, hydrogen should be provided in an amount of about 10% in excess of the minimum stoichiometric amount required.

The requirement for hydrogen for reforming in the presence of sulfur is shown in the Examples. In the absence of externally provided hydrogen, conversion is materially reduced. It may be compensated for, in part, by raising the temperature, but only to material disadvantages to the metallurgy of reactor materials.

EXAMPLE 1

Reforming was carried out using a catalyst, the catalyst consisting of 16% by weight nickel deposited as a metal salt solution and subsequent heating on a high purity ceramic alumina support known as SAHT-99 manufactured and sold by the Carbonorundum Company. The typical composition of the support is 99.5% by weight $Al_2O_3$, 0.02% by weight $SiO_2$, 0.04% by weight $Fe_2O_3$ and 0.45% by weight $Na_2O$. Surface area is in the range of 0.5 – 5.5 $m^2/g$. The feed consisted of a mixture of 0.5% by volume of a petroleum fraction containing in excess of 15% aromatic components including naphthalene and 99.5% by volume of a syngas containing 50% by volume hydrogen and 50% by volume carbon monoxide. Methane was formed at an operating pressure of 300 psia. Inlet temperature to the reforming zone was 925°F. Outlet temperature was 1400°F. Sulfur content as hydrogen sulfide was maintained at 20 ppmv and the steam to dry gas ratio at outlet was 0.6. Operation was continuous over a 10 day period without the formation of carbon.

EXAMPLE 2 AND CONTROL

Using the catalyst of Example 1, reforming was carried out using a syngas containing a controlled amount of benzene, in the presence of 2300 ppm sulfur, present as hydrogen sulfide, on volume basis. In accordance with this Example, the reforming of benzene occurred in the presence of steam at an inlet temperature of 1292° F. The benzene was completely reformed to hydrogen and carbon oxides. Operation continued through several days. For the control, the feed of syngas was stopped for a period of 19 hours. During this time conversion of benzene was reduced to two-thirds of complete conversion. Following this, the syngas was reintroduced and again the benzene was totally reformed. Reforming was continued for two additional days.

Table 1 shows the operating conditions for this Example.

TABLE 1

| Syngas Composition, volume percent, dry basis | Inlet | Outlet |
|---|---|---|
| $H_2$ | 39.3 | 42.4 |
| CO | 25.3 | 19.5 |
| $CO_2$ | 26.8 | 28.7 |
| $CH_4$ | 8.1 | 7.6 |
| COS, ppm | 2317–2656 | 46–83 |
| $H_2S$, ppm | — | 2208–2226 |
| Steam/gas ratio | — | 0.61 |
| Pressure, psig | 300 | |
| Syngas rate, CFH | 9.4 | |
| Product gas rate, CFH | 10.0 | |
| Water fed to unit, CC/hour | 150 | |
| Benzene fed to unit, CC/hour | 8 | |

What is claimed is:

1. In a process for the reforming of hydrocarbons wherein a gaseous stream comprising a hydrocarbon and water as steam is contacted with a supported reforming catalyst at a temperature from about 900° F to about 1600° F, and in which water is present in an excess amount above the stoichiometric amount required for reforming to prevent the formation of carbon, the improvement which comprises providing in the gaseous stream undergoing reforming at least 1 part per million hydrogen sulfide in place of at least a portion of the excess water required to prevent carbon formation, and providing during reforming a source of hydrogen selected from the group consisting of free hydrogen, carbon monoxide, and mixtures thereof in an amount at least sufficient for the stoichiometric conversion of all of the carbon in the hydrocarbon to methane.

2. A process as claimed in claim 1 in which a portion of the excess water is replaced by hydrogen sulfide in an amount of from about 2 to about 5000 parts per million.

3. A process as claimed in claim 1 in which a portion of the excess water is replaced by hydrogen sulfide in an amount of from about 10 to 1000 parts per million.

4. A process as claimed in claim 1 in which reforming occurs in a temperature range of from 1000° F to about 1500° F.

5. A process as claimed in claim 1 in which the hydrogen sulfide is formed from sulfur species selected from the group consisting of carbonyl sulfide, carbon disulfide, sulfur dioxide, thiophenes, mercaptans and mixtures thereof.

6. A process as claimed in claim 1 in which the hydrocarbon includes aromatic hydrocarbons.

7. In a process for the reforming of hydrocarbons wherein a gaseous stream comprising a hydrocarbon and water as steam is contacted with a supported reforming catalyst at a temperature from about 900° F to about 1600° F, and in which water is present in an excess amount above the stoichiometric amount required for reforming to suppress the formation of carbon, the improvement which comprises replacing at least a portion of the excess water required to prevent the formation of carbon with from about 2 to about 5000 parts per million hydrogen sulfide, and providing a source of hydrogen selected from the group consisting of hydrogen, carbon monoxide and mixtures thereof in an amount at least sufficient for the stoichiometric conversion of the carbon in the hydrocarbon to methane.

8. A process as claimed in claim 7 in which reforming occurs in a temperature range of from 1000° F to about 1500° F.

9. A process as claimed in claim 7 in which a portion of the excess water is replaced by hydrogen sulfide in an amount of from about 2 to about 5000 parts per million.

10. A process as claimed in claim 7 in which the hydrogen sulfide is formed from sulfur species selected from the group consisting of carbonyl sulfide, carbon disulfide, sulfur dioxide, thiophenes, mercaptans and mixtures thereof.

11. A process for reforming aromatic hydrocarbons which comprises passing a gaseous stream comprising aromatic hydrocarbons and water as steam, hydrogen sulfide in a concentration of from about 2 to about 5000 parts per million in place of at least a portion of the excess water required to prevent the formation of carbon from the aromatic hydrocarbon and a source of hydrogen selected from the group consisting of hydrogen, carbon monoxide, and mixtures thereof, in an amount at least sufficient for the stoichiometric conversion of the carbon in the aromatic hydrocarbons to methane with a supported reforming catalyst at a temperature of from about 900° F to about 1600° F to reform the aromatic hydrocarbons without the formation of carbon.

12. A process as claimed in claim 11 in which a portion of the excess water is replaced by hydrogen sulfide in an amount of from about 10 to about 1000 parts per million.

13. A process as claimed in claim 11 in which reforming occurs in a temperature range of from 1000° F to about 1500° F.

14. A process as claimed in claim 11 in which the hydrogen sulfide is formed from sulfur species selected from the group consisting of carbonyl sulfide, carbon disulfide, sulfur dioxide, thiophenes, mercaptans and mixtures thereof.

* * * * *

UNITED STATES PATENT AND TRADEMARK OFFICE
CERTIFICATE OF CORRECTION

PATENT NO. : 3,999,961

DATED : December 28, 1976

INVENTOR(S) : Gerald A. White, Theodore R. Roszkowski and Harold W. Fleming

It is certified that error appears in the above-identified patent and that said Letters Patent are hereby corrected as shown below:

Column 1, line 48, "mainly of hydrogen and carbon oxides to methane," should read -- mainly of hydrogen, carbon oxides and methane, --.

Column 3, line 57, "impossible" should read -- possible --.

Column 3, line 45, "stream" should read -- steam --.

Signed and Sealed this

Thirteenth Day of September 1977

[SEAL]

Attest:

RUTH C. MASON
Attesting Officer

LUTRELLE F. PARKER
Acting Commissioner of Patents and Trademarks